United States Patent [19]

Schoefberger

[11] 4,001,206

[45] Jan. 4, 1977

[54] OPTIONALLY SUBSTITUTED BENZOTHIAZOLYLPHENYL-AZO-ALKANOYLACETAMIDONAPHTHALENES

[75] Inventor: Georg Schoefberger, Basel, Switzerland

[73] Assignee: Sandoz Ltd., Basel, Switzerland

[22] Filed: Feb. 11, 1972

[21] Appl. No.: 225,629

[30] Foreign Application Priority Data

Feb. 16, 1971  Switzerland ............... 2250/71

[52] U.S. Cl. .................................. 260/158; 8/7; 260/507 R; 260/562 K; 260/304 R
[51] Int. Cl.$^2$ ................. C09B 29/32; D06P 1/06; D21H 3/80
[58] Field of Search ............... 260/158; 8/7, 82, 86

[56] References Cited

UNITED STATES PATENTS

| | | | |
|---|---|---|---|
| 1,159,386 | 11/1915 | Huismann | 260/158 |
| 2,857,373 | 10/1958 | Straley et al. | 260/146 R |
| 3,274,171 | 9/1966 | Anderson et al. | 260/158 |
| 3,426,010 | 2/1969 | Dynworth | 260/158 |

*Primary Examiner*—Floyd D. Higel
*Attorney, Agent, or Firm*—Gerald D. Sharkin; Richard E. Vila; Melvyn M. Kassenoff

[57] ABSTRACT

Disclosed are compounds of the formula
in which
R, $R_1$ and $R_4$, which may be the same or different, each signify a hydrogen atom, an alkyl radical of 1 to 6 carbon atoms or an alkoxy radical of 1 to 6 carbon atoms,
$R_2$ signifies an alkyl radical of 1 to 6 carbon atoms,
$R_3$ signifies a hydrogen atom or an alkyl radical of 1 to 6 carbon atoms,
$n$ signifies 0 or 1,
$m$ signifies 0 or 1, and
$p$ signifies 0 to 3 with the proviso that the compounds contain at least one sulphonic acid group; their water soluble salts, process for the production thereof, compositions containing same and a process for dyeing paper therewith.

The dyes are highly substantive to paper and produces dyeings that exhibit good fastness to light, water, milk, fruit juices and alcohol but that are bleachable by oxidation or reduction.

19 Claims, No Drawings

OPTIONALLY SUBSTITUTED BENZOTHIAZOLYLPHENYL-AZO-ALKANOYLACETAMIDONAPHTHALENES

The present invention relates to azo dyes.

According to the present invention, there are provided compounds of formula I,

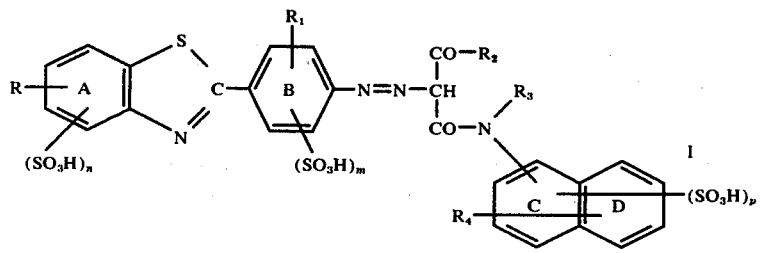

in which
R, $R_1$ and $R_4$, which may be the same or different, each signify a hydrogen atom, an alkyl radical of 1 to 6 carbon atoms or an alkoxy radical of 1 to 6 carbon atoms,
$R_2$ signifies an alkyl radical of 1 to 6 carbon atoms,
$R_3$ signifies a hydrogen atom or an alkyl radical of 1 to 6 carbon atoms,
$n$ signifies 0 or 1,
$m$ signifies 0 or 1, and
$p$ signifies 0 to 3
with the proviso that the compounds contain at least one sulphonic acid group, i.e., the sum of $m$, $n$, and $p$ is 1 to 5, in free acid or water-soluble salt form.

The water soluble salts of the compounds of formula I may, for example, be the alkali metal or ammonium salts thereof, preferably sodium salts.

In the compounds of formula I, any alkyl or alkoxy radicals are preferably of 1 to 3 carbon atoms, R is preferably in the para position to the nitrogen atom and most preferably signifies a methyl radical. $R_1$ and $R_4$ preferably signify a hydrogen atom. $R_2$ most preferably signifies a methyl radical. $R_3$ preferably signifies a hydrogen atom or a methyl or ethyl radical.

The preferred compounds of formula I have 2 to 4 sulphonic acid groups if ring D bears 2 such groups, or 2 or 3 sulphonic acid groups if ring D bears only 1 such group.

An interesting group of compounds are those of the formula

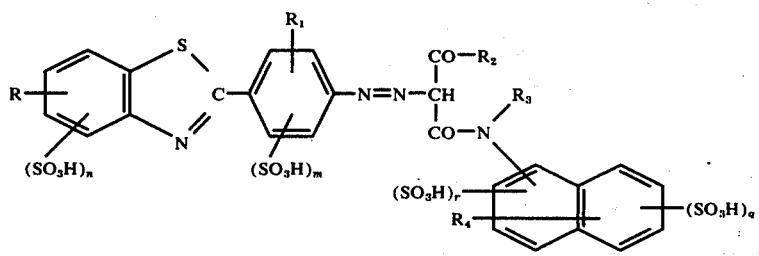

wherein R, $R_1$, $R_2$, $R_3$, $R_4$, $m$ and $n$ are defined above, $q$ is 1 or 2, $r$ is 0 to 2, the sum of $q$ and $r$ is 1 to 3 and the sum of $m$, $n$, $q$ and $r$ is 1 to 5, and the preferred compounds of this application are those of this group wherein (1) $q$ is 1 and the sum of $m$, $n$, $q$ and $r$ is 2 or 3 or (2) $q$ is 2 and the sum of $m$, $n$, $q$ and $r$ is 2 to 4.

Representative of the compounds of formula I are the compounds of formula Ia and Ib,

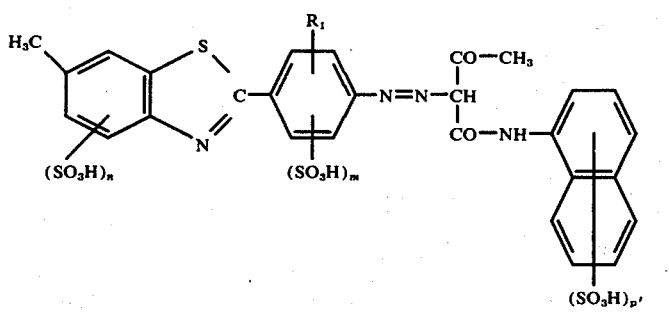

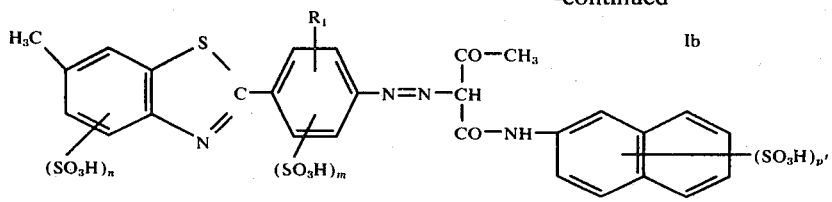

wherein $R_1$, $n$ and $m$ are as defined above, and $p'$ is 1 to 3.

The invention also provides a process for the production of a compound of formula I, stated above, characterized by reacting a diazo derivative of an amine of formula II,

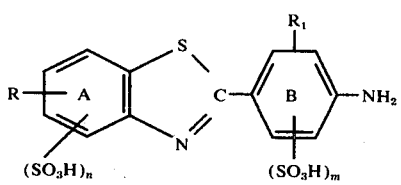

in which R, $R_1$, $n$, $m$ and rings A and B are as defined above in connection with formula I, with a compound of formula III,

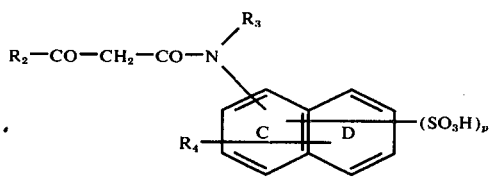

in which $R_2$, $R_3$, $R_4$, $p$ and rings C and D are as defined above in connection with formula I.

The reaction may be carried out according to known methods, for example in an aqueous, weakly acid, neutral or alkaline medium, preferably in a neutral to weakly alkaline medium. Similarly, the diazo derivative of the amine of formula II may be obtained in known manner.

The amines of formula II are either known or can be produced in analogous manner to that for known compounds, for example as described in Berichte 22, 970 (1889) Annalen 558, 16 (1947) or German Pat. No. 281,048.

Similarly, the compounds of formula III are known or can be produced in analogous manner to that for known compounds, for example, as described in German Pat. No. 749,975 or in U.S. Pat. No. 2,328,353.

The water-soluble salts of the compounds of formula I may be obtained in manner known per se, for example by carrying out the reaction in the presence of, or by treating the resulting compounds of formula I with, an aqueous alkali metal or ammonium hydroxide or salt solution. Alternatively, salt forms of the compounds of formulae II and III may be used.

The compounds of formula I and the water-soluble salts thereof may be isolated in manner known per se.

The compounds of formula I and the water-soluble salts thereof possess good solubility properties, having notably good solubility in cold water.

The invention also provides a process for dyeing paper, characterised by applying to the paper a compound of formula I or a water-soluble salt thereof.

The compound of formula I or water-soluble salt thereof may be added to the paper stock as dry powder or as granules, or the paper, in sized or unsized sheet form may be dyed by dipping methods using a solution or dispersion of the compound of formula I or water-soluble salt thereof.

Preferably, after the paper has been dyed, it is treated with a cationic fixing agent, for example, with one of such agents disclosed in French Pat. No. 956,501 or in German Pat. Nos. 671,704 and 918,743.

The dry powder or granule form of the dye may be produced by known methods, for example as described in French Pat. No. 1,581,900. The granulated form preferably contains, in addition to the compound of formula I or water-soluble salt thereof, 0.1 to 50% by weight of a salt which dissociates in water, e.g. sodium chloride or sodium sulphate, the average size of the granules being at least 20 microns.

The solution or dispersion of the compound of formula I or water-soluble salt thereof is preferably obtained by diluting a liquid dye concentrate preparation which contains one part by weight of a dye component, 2 to 8 parts by weight of water and 0.5 to 5 parts by weight of an acid amide, the dye component containing 0.5 to two parts by weight of an alkali metal salt to 10 parts by weight of a compound of formula I or water-soluble salt thereof.

The alkali metal salt may, for example, be sodium chloride or sodium sulphate.

The acid amide is preferably a carboxylic acid amide of 1 to 4 carbon atoms, for example urea.

The above described liquid dye concentrate preparation forms part of the present invention and is particularly suitable for use in dyeing paper, it being stable in storage for notably long periods. It may be obtained by mixing the ingredients, if necessary heat being applied to aid the mixing. Preferably, the preparation is prepared from an aqueous press-cake, as obtained in manufacture, containing 0.5 to 2 parts by weight of the alkali metal salt to ten parts by weight of the compound of formula I or water-soluble salt thereof.

Preferably, the press-cake and the liquid dye concentrate preparation contain 0.8 to 1.8, more preferably only 1.0 to 1.5 parts by weight of the alkali metal salt to the ten parts of the compound of formula I or water-soluble salt thereof.

The compounds of formula I and the water-soluble salts thereof are highly substantive to paper, white water from the paper machine during the dyeing of paper being only slightly coloured.

The dyes are substantially unaffected by pH conditions and dyed paper is free from mottled and so-called "two-sided" effects. The dyeings produced are of good shade and are light fast, showing a tone-in-tone fade after a long period of exposure to light. The dyed paper has good fastness to water, milk, fruit juices, sweetened mineral water and is stable to alcohol. Paper dyed with compounds of formula I or their water-soluble salts can be bleached by oxidation and reduction bleaching methods.

In comparison with the known similar dyes of formulae IV and V,

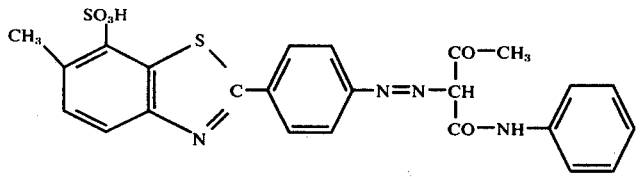

IV

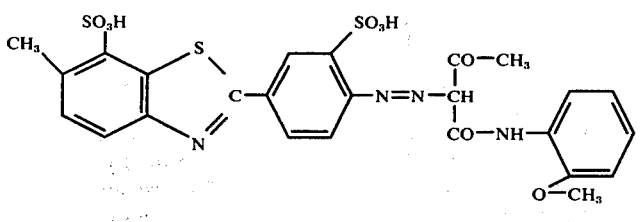

V the compounds of formula I have notable solubility properties, are particularly suitable for dry addition to paper stock and have noteworthy properties after fixing with cationic fixing agents. Moreover, in comparison to known compounds similar to those of formula V, but which are sulphonated in the benzene radical Z, the compounds of formula I and the water-soluble salts thereof show marked substantivity to paper and notable wet and alcohol fastness, especially when fixed with a cationic fixing agent.

The following Examples, in which all parts are by weight and the temperatures are in degrees Centigrade, illustrate the invention.

EXAMPLE 1: Production of a compound of formula I'

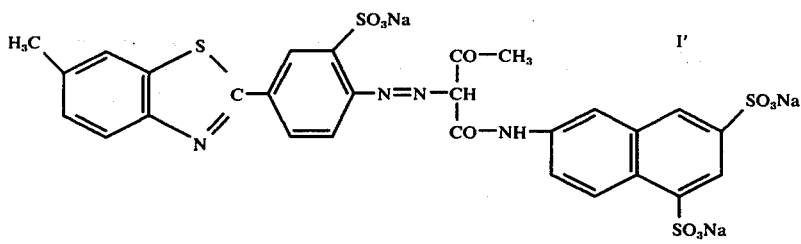

A mixture of 34 parts of the sodium salt of 2-(4'-amino-3'-sulphophenyl)-6-methylbenzothiazole, 7 parts of sodium nitrite and 1000 parts of water is stirred to form a homogeneous suspension. The suspension is run slowly into a mixture of 25 parts of 30% hydrochloric acid and 100 parts of ice. The corresponding diazo compound is formed. It is added with vigorous stirring to a solution of 43 parts of the disodium salt of 2-acetoacetylaminonaphthalene-5,7-disulphonic acid and 20 parts of sodium carbonate in 400 parts of water. The monoazo dye of formula I', thus formed is precipitated from the solution at 50° by the addition of 200 parts of sodium chloride and is isolated by filtration.

The filtercake can be used as is to produce the dye preparations described in Examples 6 and 7. In the dry state the dye is a yellow powder which dissolves in water with a yellow colour and dyes paper greenish yellow shades.

EXAMPLE 2: Production of a compound of formula I''

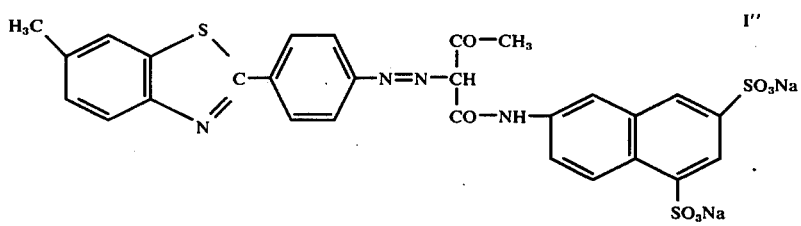

Over a period of 2 hours, a solution of 7 parts of sodium nitrite in 25 parts of water is allowed to run into a mixture of 24 parts of 2-(4-aminophenyl)-6-methyl-benzothiazole, 200 parts of water, 25 parts of 30% hydrochloric acid and 100 parts of ice. The diazo compound formed is added to a solution of 43 parts of the disodium salt of 2-acetoacetylaminonaphthalene-5,7-disulphonic acid and 25 parts of sodium bicarbonate in 200 parts of water and 200 parts of ice. When the coupling reaction is complete the suspension is heated and the dye of formula I'' is precipitated by the addition of sodium chloride and is isolated by filtration.

The filtercake can be used, as obtained, to produce the dye preparations described in Examples 6 and 7.

Alternatively, it can be dried to give a yellow powder which dissolves readily in water with a yellow colour and which dyes paper brilliant greenish yellow shades.

EXAMPLE 3: Production of a compound of formula I'''

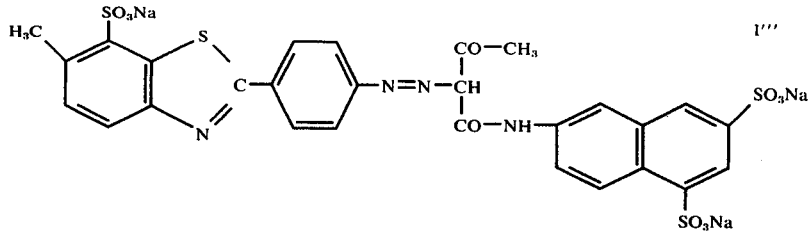

32 Parts of 2-(4'-aminophenyl)-6-methylbenzothiazole-7-sulphonic acid are dissolved in 600 parts of water with the aid of 15 parts of 30% sodium hydroxide solution. After the addition of 7 parts of sodium nitrite, the solution is run into a thoroughly stirred mixture of 25 parts of 30% hydrochloric acid and 100 parts of ice. The diazo compound formed is added slowly to a solution of 43 parts of the disodium salt of 2-acetoacetylaminonaphthalene-5,7-disulphonic acid in 250 parts of water. During the addition the pH is maintained between 7.5 and 8.5 by the gradual addition of 20 parts of sodium carbonate while the temperature is held below 10° by adding ice. A solution of yellowish brown colour is formed. It is raised to a temperature of 60°, and 200 parts of sodium chloride are added, whereupon dye of formula I''' is precipitated and isolated by filtration.

The filtercake can be used directly to produce the dyeing preparations described in Examples 6 and 7. If, instead, is is dried, a yellow powder is obtained which dissolves readily in water to give solutions of yellow colour which dye paper brilliant greenish yellow shades.

EXAMPLE 4: Production of a compound of formula I$^{iv}$

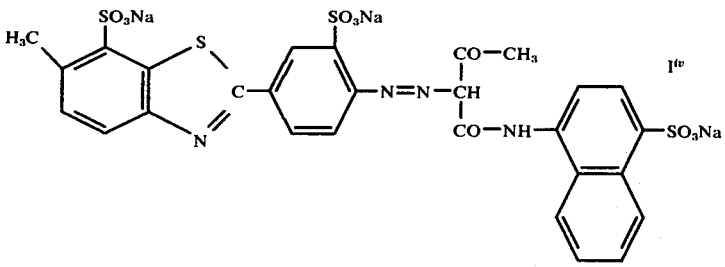

A solution of 40 parts of 2-(4'-amino-3'-sulphophenyl)-6-methylbenzothiazole-7-sulphonic acid in 800 parts of water is prepared. 30 Parts of 30% hydrochloric acid and 300 parts of ice are added, then a solution of 7 parts of sodium nitrite in 50 parts of water is allowed to run in at a slow rate. The solution of the diazo component thus formed is added to a solution of 33 parts of the sodium salt of 1-acetoacetylaminonaphthalene-4-sulphonic acid and 25 parts of sodium carbonate in 200 parts of water. From the final yellowish brown solution the dye of formula I$^{iv}$ is precipitated at 60° by addition of 300 parts of sodium chloride and is isolated by filtration.

The filtercake can be used as obtained to produce the dyeing preparations described in Examples 6 and 7, or it can be dried to give a yellow powder which dissolves readily in water and which dyes paper brilliant greenish yellow shades.

EXAMPLE 5: Production of a compound of formula I$^v$

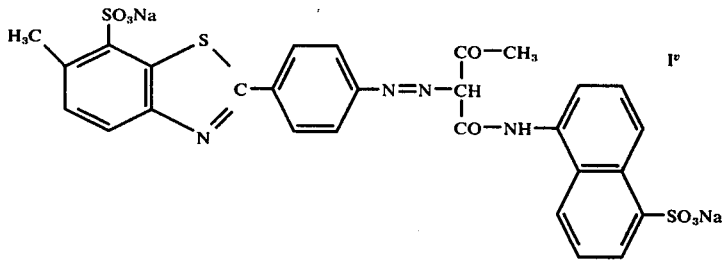

By repeating the procedure of Example 4, but using 1-acetoacetylaminonaphthalene-5-sulphonic acid in place of 1-acetoacetylaminonaphthalene-4-sulphonic acid the compound of formula I$^v$ is obtained. It has comparable properties to the dye of Example 4 and gives greenish yellow dyeings on paper.

EXAMPLE 6

60 Parts of the compound of formula I' (obtained as in Example 1) in the form of the filtercake are added at room temperature to a solution of 40 parts of sodium sulphate in 300 parts of water and stirred until a homogeneous dispersion is formed. The dispersion is dried in an atomizer. Yellow granules averaging 90 microns in size are obtained. They dissolve readily in water and dye paper in brilliant greenish yellow shades.

The filtercake of the dyes obtained by the operating procedures of Examples 2 to 5 can be converted into granules by the same method.

EXAMPLE 7

120 Parts of the compound of formula I' (obtained as in Example 1) in the form of the filtercake are added to a solution of 200 parts of urea and 500 parts of water with stirring until a homogeneous suspension is formed. The temperature is increased to 50° whereupon the dye goes into solution. The solution is clarified by filtration in the presence of a filtering aid and is then diluted with water to 1000 parts. This dye solution is stable for several months at room temperature and is used for dyeing paper in bright greenish yellow shades.

If the dyes of Examples 2 to 5 are used in place of the dye of Example 1, dye solutions with equally good storage stability are obtained.

The structural composition of further dyes is shown in the table below. They can be produced analogously to the reaction procedures of Examples 1 to 5 and agree with formula Ie,

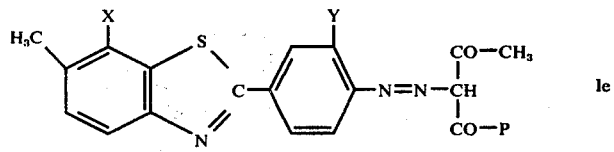

Ie where X, Y and P have the meanings assigned to them in the table. These dyes give dyeings of greenish yellow shade on paper. The compounds are shown in the table, in their free acid form although, as will be appreciated, by following the procedures of Examples 1 to 5, they would be obtained in sodium salt form.

| Example No. | X | Y | P |
|---|---|---|---|
| 8 | SO₃H | SO₃H | −NH−(naphthyl)−SO₃H |
| 9 | SO₃H | SO₃H | −NH−(naphthyl)−SO₃H |
| 10 | SO₃H | H | −NH−(naphthyl)(SO₃H)(SO₃H) |
| 11 | H | SO₃H | " |
| 12 | H | H | " |
| 13 | H | SO₃H | −NH−(naphthyl)(SO₃H)(HO₃S) |
| 14 | H | SO₃H | −NH−(naphthyl)(SO₃H)(SO₃H) |
| 15 | SO₃H | SO₃H | " |
| 16 | SO₃H | H | −NH−(naphthyl)(SO₃H)(SO₃H) |
| 17 | SO₃H | SO₃H | " |
| 18 | SO₃H | SO₃H | −NH−(naphthyl)(CH₃O)(SO₃H) |
| 19 | H | H | −NH−(naphthyl)(SO₃H)(SO₃H)(SO₃H) |
| 20 | SO₃H | H | −NH−(naphthyl)(SO₃H)(HO₃S) |
| 21 | SO₃H | SO₃H | " |
| 22 | H | SO₃H | " |
| 23 | SO₃H | SO₃H | −NH−(naphthyl) |
| 24 | SO₃H | SO₃H | −NH−(naphthyl) |
| 25 | SO₃H | SO₃H | −NH−(naphthyl)(SO₃H)(SO₃H)(NH−COCH₃) |

-continued

| Example No. | X | Y | P |
|---|---|---|---|
| 26 | SO₃H | SO₃H | -NH-[naphthalene with SO₃H and CH₃] |
| 27 | SO₃H | SO₃H | -N(CH₃)-[naphthalene with SO₃H] |
| 28 | SO₃H | H | -NH-[naphthalene with 2 SO₃H] |

-continued

| Example No. | X | Y | P |
|---|---|---|---|
| 29 | SO₃H | SO₃H | -NH-[naphthalene with 2 SO₃H] |

The full structural formulae of the compounds of Examples 10 and 28, respectively, are as follows:

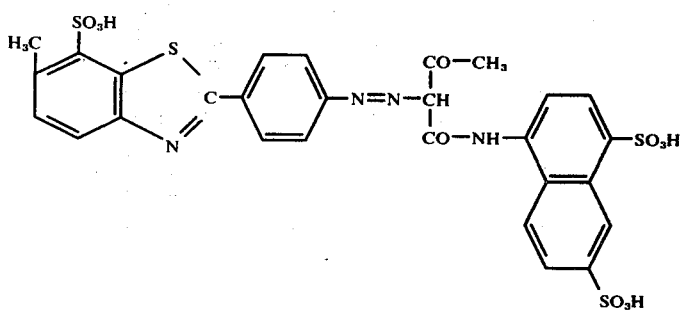

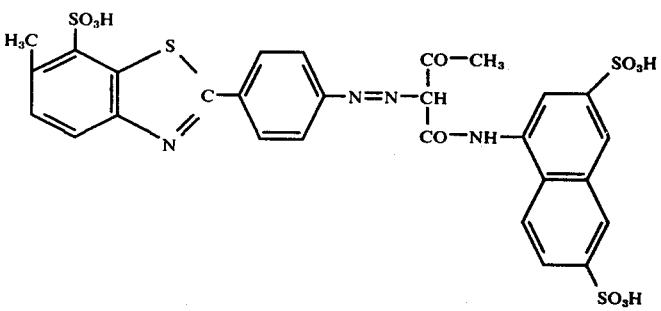

In the foregoing Examples, the resulting compounds are isolated in the form of sodium salts. As will be appreciated such salt forms may be converted into other water-soluble salt forms, e.g. other alkali metal or ammonium salt forms, or into free acid forms in conventional manner.

The full structural formulae of the compounds of Examples 1, 2 and 4 in free acid form are as follows:

Example 1

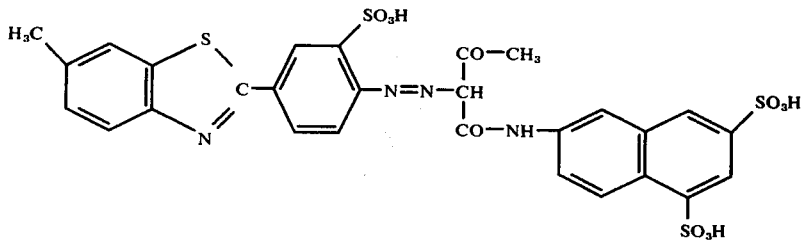

Example 2

-continued

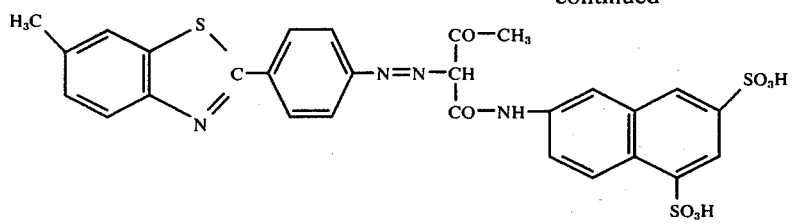

Example 4

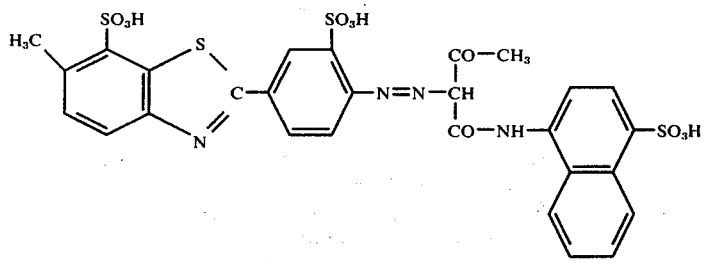

EXAMPLES OF APPLICATION

EXAMPLE A

Paper stock consisting of 70 parts of chemically bleached sulphite pulp from softwood and 30 parts of chemically bleached sulphate pulp from birch is suspended in 2000 parts of water and beaten in a hollander beater. 0.2 Parts of the dye preparation described in Example 6 are sprinkled into the stock, which is then beaten for a further 20 minutes. On the paper machine the stock is converted into sheet, dyed in a greenish yellow shade. The white water from the wire is virtually colourless.

EXAMPLE B

A solution of 0.5 parts of the powder dye described in Example 1 is prepared, cooled to room temperature, and added to a suspension of 100 parts of chemically bleached sulphite pulp in 200 parts of water in the beater. After further beating for 15 minutes the stock is sized and the sheet formed. This is dyed in a greenish yellow shade of medium depth which has good wet fastness properties.

EXAMPLE C

If the 0.2 parts of the dye preparation of Example 6 used in Example A are replaced by 1 part of the liquid dye preparation of Example 7, the paper is dyed in a similar shade with comparable fastness properties.

EXAMPLE D

A sheet of absorbent, unsized paper is conveyed through a dye solution at 40°–50° consisting of 0.5 parts of the dyeing preparation of Example 6, 0.5 parts of starch and 99 parts of water. The excess solution is expressed by a pair of roller and the sheet dried. It is dyed in a greenish yellow shade.

What is claimed is:

1. A compound of the formula

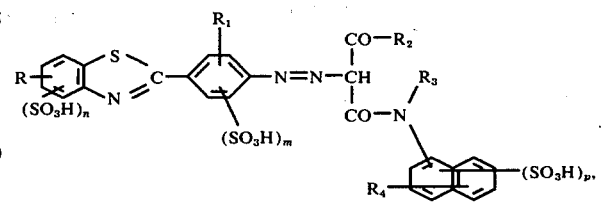

or a water-soluble salt thereof,
wherein
R is hydrogen, alkyl of 1 to 6 carbon atoms or alkoxy of 1 to 6 carbon atoms,
$R_1$ is hydrogen, alkyl of 1 to 6 carbon atoms or alkoxy of 1 to 6 carbon atoms,
$R_2$ is alkyl of 1 to 6 carbon atoms,
$R_3$ is hydrogen or alkyl of 1 to 6 carbon atoms,
$R_4$ is hydrogen, alkyl of 1 to 6 carbon atoms or alkoxy of 1 to 6 carbon atoms,
$m$ is 0 or 1,
$n$ is 0 or 1,
$p$ is 0 to 3,
with the proviso that the sum of $m$, $n$ and $p$ is 1 to 5.

2. An alkali metal or ammonium salt according to claim 1.

3. A sodium salt according to claim 2.

4. A compound according to claim 1, or a water-soluble salt thereof, wherein each alkyl and alkoxy independently has 1 to 3 carbon atoms.

5. A compound according to claim 1, or a water-soluble salt thereof, wherein R is methyl, with the proviso that the R group is in the 6-position of the benzothiazole ring.

6. A compound according to claim 5, or a water-soluble salt thereof, wherein $R_2$ is methyl.

7. A compound according to claim 6, or a water-soluble salt thereof, wherein $R_4$ is hydrogen.

8. A compound according to claim 7, or a water-soluble salt thereof, wherein $R_3$ is hydrogen, methyl or ethyl.

9. A compound according to claim 8, or a water-soluble salt thereof, wherein $R_1$ is hydrogen.

10. A compound according to claim 8 having the formula

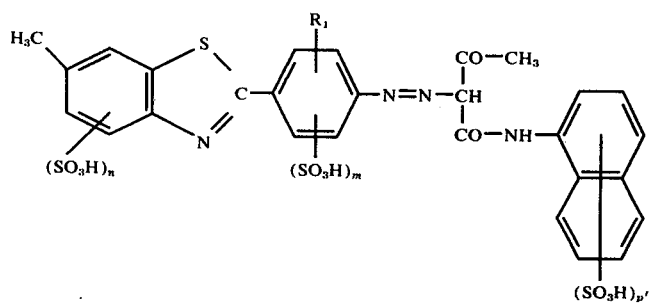

or a water-soluble salt thereof,
wherein
$R_1$ is hydrogen, alkyl of 1 to 6 carbon atoms or alkoxy of 1 to 6 carbon atoms,
$m$ is 0 or 1,
$n$ is 0 or 1, and
$p'$ is 1 to 3.

11. A compound according to claim 8 having the formula

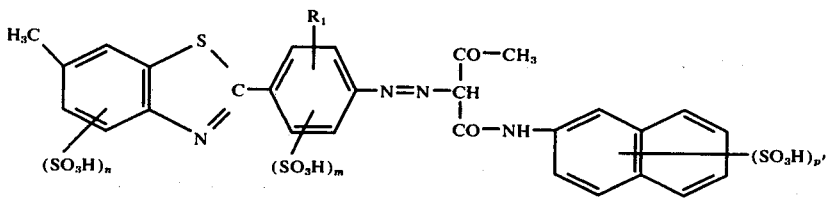

or a water-soluble salt thereof,
wherein
$R_1$ is hydrogen, alkyl of 1 to 6 carbon atoms or alkoxy of 1 to 6 carbon atoms,
$m$ is 0 or 1,
$n$ is 0 or 1, and
$p'$ is 1 to 3.

12. A compound according to claim 1 having the formula

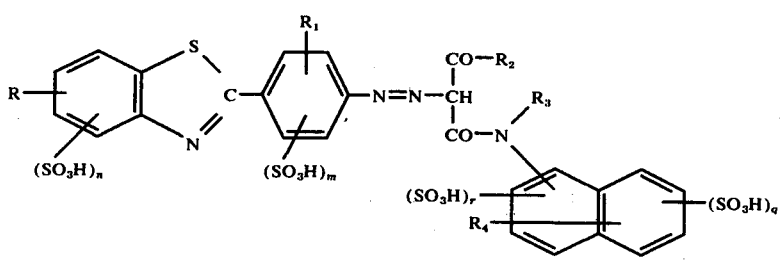

or a water-soluble salt thereof,
wherein $R$ is hydrogen, alkyl of 1 to 6 carbon atoms or alkoxy of 1 to 6 carbon atoms,
$R_1$ is hydrogen, alkyl of 1 to 6 carbon atoms or alkoxy of 1 to 6 carbon atoms,
$R_2$ is alkyl of 1 to 6 carbon atoms,
$R_3$ is hydrogen or alkyl of 1 to 6 carbon atoms,
$R_4$ is hydrogen, alkyl of 1 to 6 carbon atoms or alkoxy of 1 to 6 carbon atoms,
$m$ is 0 or 1,
$n$ is 0 or 1,
$q$ is 1 or 2, and
$r$ is 0 to 2,
with the proviso that the sum of $q$ and $r$ is 1 to 3 and the sum of $m$, $n$, $q$ and $r$ is 1 to 5.

13. A compound according to claim 12, or a water-soluble salt thereof, wherein $q$ is 1, with the proviso that the sum of $m$, $n$, $q$ and $r$ is 2 or 3.

14. A compound according to claim 12, or a water-soluble salt thereof, wherein $q$ is 2, with the proviso that the sum of $m$, $n$, $q$ and $r$ is 2 to 4.

15. The compound according to claim 9 having the formula

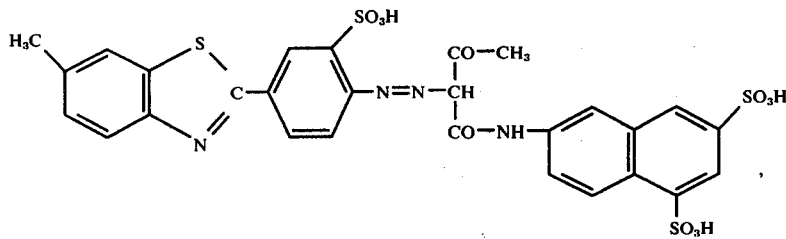

or a water-soluble salt thereof.

16. The compound according to claim 9 having the formula

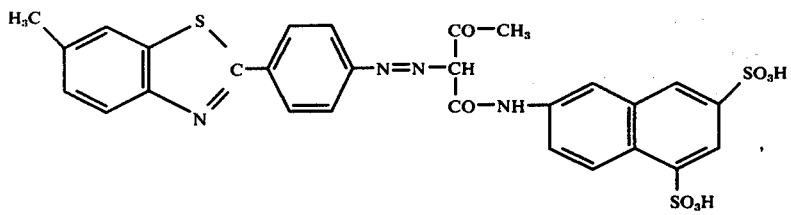

or a water-soluble salt thereof.

17. The compound according to claim 9 having the formula

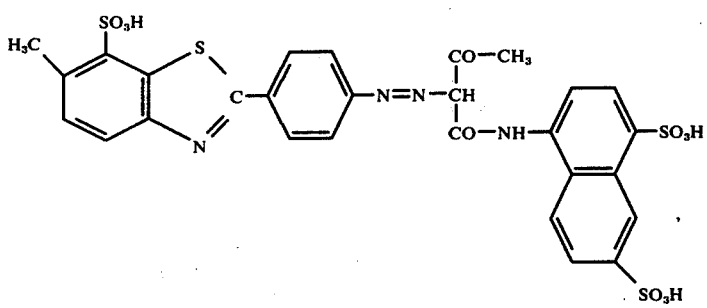

or a water-soluble salt thereof.

18. The compound according to claim 9 having the formula

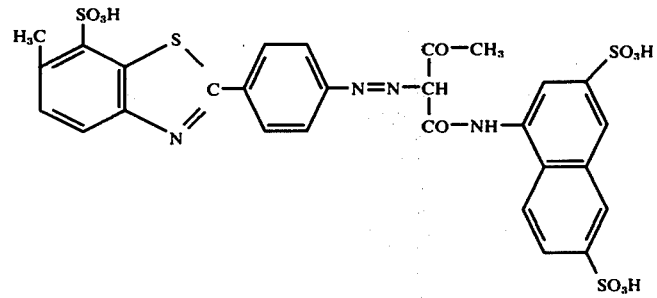

or a water-soluble salt thereof.

19. The compound according to claim 9 having the formula

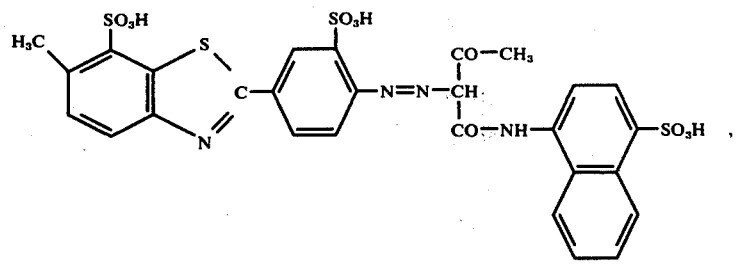

or a water-soluble salt thereof.